(12) United States Patent
Kelkar et al.

(10) Patent No.: US 9,480,963 B2
(45) Date of Patent: Nov. 1, 2016

(54) THERMO-CATALYTIC CRACKING FOR CONVERSION OF HIGHER HYDROCARBONS INTO LOWER HYDROCARBONS

(71) Applicant: Innovative Energy Solutions, Inc., Ames, IA (US)

(72) Inventors: Atul G. Kelkar, Ames, IA (US); Prasad V. Bhat, Mumbai Maharashtra (IN)

(*) Notice: Subject to any disclaimer, the term of this patent is extended or adjusted under 35 U.S.C. 154(b) by 0 days.

(21) Appl. No.: 14/549,330

(22) Filed: Nov. 20, 2014

(65) Prior Publication Data
US 2015/0080625 A1 Mar. 19, 2015

Related U.S. Application Data

(63) Continuation of application No. 12/819,137, filed on Jun. 18, 2010, now Pat. No. 8,895,796.

(60) Provisional application No. 61/218,579, filed on Jun. 19, 2009.

(51) Int. Cl.
*B01J 19/18* (2006.01)
*C10G 1/00* (2006.01)
(Continued)

(52) U.S. Cl.
CPC ......... *B01J 19/1887* (2013.01); *B01J 19/0066* (2013.01); *C10G 1/002* (2013.01); *C10G 1/083* (2013.01); *C10G 1/10* (2013.01); *C10G 11/14* (2013.01); *C10G 57/005* (2013.01); *C10G 57/02* (2013.01); *C10G 63/04* (2013.01); *C10L 1/04* (2013.01); *B01J 2219/00094* (2013.01); *C10G 2300/1003* (2013.01); *C10G 2300/1014* (2013.01); *C10G 2300/4056* (2013.01); *C10L 2200/0438* (2013.01); *C10L 2200/0453* (2013.01); *C10L 2200/0469* (2013.01); *C10L 2200/0484* (2013.01); *C10L 2290/06* (2013.01);
(Continued)

(58) Field of Classification Search
CPC ........................... B01J 19/1887; C10G 11/10
See application file for complete search history.

(56) References Cited

U.S. PATENT DOCUMENTS 3,316,958 A * 5/1967 Johnston ................ B01D 1/225
159/6.2
3,334,680 A 8/1967 McManus
(Continued)

FOREIGN PATENT DOCUMENTS

EP 0 247 678 B1 2/1990
EP 0 607 862 7/1994
(Continued)

OTHER PUBLICATIONS

Yoon, International Search Report and Written Opinion of the International Searching Authority issued to International Patent Application No. PCT/US2010/039179 on Feb. 25, 2011, 10 pgs.
(Continued)

*Primary Examiner* — Lessanework Seifu
(74) *Attorney, Agent, or Firm* — Foley & Lardner LLP; Cliff Z. Liu; Angela D. Murch

(57) ABSTRACT

Described herein are processes and related devices and systems for the conversion of higher hydrocarbons, such as in the form of waste plastics, petroleum sludge, slope oil, vegetable oil, and so forth, into lower hydrocarbons, which can be used as fuels or raw materials for a variety of industrial and domestic uses.

13 Claims, 9 Drawing Sheets

(51) Int. Cl.
*C10G 1/08* (2006.01)
*C10G 1/10* (2006.01)
*C10G 11/14* (2006.01)
*B01J 19/00* (2006.01)
*C10G 57/00* (2006.01)
*C10G 57/02* (2006.01)
*C10G 63/04* (2006.01)
*C10L 1/04* (2006.01)

(52) U.S. Cl.
CPC ........ *C10L 2290/24* (2013.01); *C10L 2290/46* (2013.01); *C10L 2290/562* (2013.01); *Y02P 30/20* (2015.11)

(56) References Cited

U.S. PATENT DOCUMENTS

| | | | |
|---|---|---|---|
| 4,093,479 A * | 6/1978 | Baird | B01D 1/226 |
| | | | 159/13.2 |
| 4,108,730 A | 8/1978 | Chen et al. | |
| 4,143,086 A | 3/1979 | Carle et al. | |
| 4,166,773 A | 9/1979 | Higley et al. | |
| 4,218,306 A | 8/1980 | Gross et al. | |
| 4,806,210 A | 2/1989 | Van Lier | |
| 5,079,385 A | 1/1992 | Wu | |
| 5,110,446 A | 5/1992 | Harandi et al. | |
| 5,216,149 A | 6/1993 | Evans et al. | |
| 5,300,704 A | 4/1994 | Evans et al. | |
| 5,321,174 A | 6/1994 | Evans et al. | |
| 5,326,919 A | 7/1994 | Paisley et al. | |
| 5,359,061 A | 10/1994 | Evans et al. | |
| 5,359,099 A | 10/1994 | Evans et al. | |
| 5,464,602 A | 11/1995 | Evans et al. | |
| 5,608,136 A | 3/1997 | Maezawa et al. | |
| 5,705,724 A | 1/1998 | Collins et al. | |
| 5,821,553 A | 10/1998 | Evans et al. | |
| 6,011,187 A | 1/2000 | Horizoe et al. | |
| 6,172,271 B1 | 1/2001 | Horizoe et al. | |
| 6,193,780 B1 | 2/2001 | Cases Rocati et al. | |
| 6,774,272 B2 | 8/2004 | Miller | |
| 6,822,126 B2 | 11/2004 | Miller | |
| 6,881,303 B2 | 4/2005 | Inoue et al. | |
| 7,034,198 B2 | 4/2006 | Osada et al. | |
| 7,276,148 B2 | 10/2007 | Plopski | |
| 2001/0027936 A1 | 10/2001 | Morel et al. | |
| 2002/0170848 A1 | 11/2002 | Mohr et al. | |
| 2003/0019789 A1 | 1/2003 | Kwak | |
| 2004/0043445 A1 | 3/2004 | Daniels | |
| 2006/0011514 A1 | 1/2006 | van den Berge et al. | |
| 2006/0096890 A1 | 5/2006 | Pankaj et al. | |
| 2006/0147357 A1 | 7/2006 | Leveson | |
| 2007/0179326 A1 | 8/2007 | Baker | |
| 2007/0284284 A1 | 12/2007 | Zones et al. | |
| 2009/0050525 A1 * | 2/2009 | Sappok | C10G 1/10 |
| | | | 208/106 |
| 2010/0004419 A1 | 1/2010 | Hassan et al. | |
| 2010/0326887 A1 | 12/2010 | McGehee et al. | |

FOREIGN PATENT DOCUMENTS

| | | |
|---|---|---|
| JP | 04-050293 | 2/1992 |
| JP | 06-256769 | 9/1994 |
| JP | 08-034978 | 2/1996 |
| JP | 08-113786 | 5/1996 |
| JP | 08-143871 | 6/1996 |
| JP | 2000-297176 | 10/2000 |
| JP | 2007-529574 A | 10/2007 |
| JP | 2007-332345 | 12/2007 |
| JP | 2008-531799 | 8/2008 |
| WO | WO 2006/092306 A1 * | 9/2006 |
| WO | WO-2006/092306 A1 | 9/2006 |

OTHER PUBLICATIONS

Partial Supplementary European Search Report on European Application No. 10790267.8 dated Apr. 24, 2015, 7 pages.

Office action issued in Canadian Patent Application No. 2,765,480 dated Apr. 8, 2016, 3 pages.

* cited by examiner

Subsystem-S1

Subsystem-S3

THERMO-CATALYTIC CRACKING FOR CONVERSION OF HIGHER HYDROCARBONS INTO LOWER HYDROCARBONS

CROSS REFERENCE TO RELATED APPLICATION

This application is a continuation of U.S. application Ser. No. 12/819,137, filed on Jun. 18, 2010, which claims the benefit of U.S. Provisional Application No. 61/218,579, filed on Jun. 19, 2009, the disclosures of which are incorporated herein by reference in their entirety.

FIELD OF THE INVENTION

The invention relates generally to the processing of hydrocarbons. More particularly, the invention relates to the conversion of higher hydrocarbons, such as in the form of waste plastics, petroleum sludge, slope oil, vegetable oil, furnace oil, edible oil, rubber products, and so forth, into lower hydrocarbons, which can be used as fuels or raw materials for a variety of industrial and domestic uses.

BACKGROUND

Pyrolytic cracking and thermo-catalytic cracking have been used to convert waste plastics, petroleum sludge, slope oil, and vegetable oil into lower hydrocarbons. However, many of the processes and devices used to achieve this conversion have failed to produce useful end products efficiently and economically to be commercially viable.

Pyrolytic cracking typically refers to a process in which higher hydrocarbons are heated to elevated temperatures of up to about 800° C. at which chemical bonds break to form lower hydrocarbons. To achieve these elevated temperatures, a large amount of energy is involved. Typically, the cost of the energy involved outweighs the value of end products produced. Certain existing implementations for pyrolytic cracking use molten metal baths as a heating medium for achieving elevated temperatures. However, achieving these elevated temperatures using molten metal baths tends to be inefficient in terms of cost and maintenance. Moreover, the use of molten metal baths poses occupational health hazards, given the tendency of metals to oxidize over time. Other existing implementations carry out a pyrolysis stage, which is then followed by a catalytic conversion stage to convert higher hydrocarbons into lower hydrocarbons. However, such implementations continue to suffer from the use of elevated temperatures and large amounts of energy during the initial pyrolysis stage.

Thermo-catalytic cracking typically refers to a process of converting higher hydrocarbons into lower hydrocarbons in the presence of a set of catalysts, such that the process can be carried out at lower temperatures than those typically involved in pyrolytic cracking. There have been a few unsuccessful attempts to incorporate thermo-catalytic cracking in a commercially viable plant that can convert higher hydrocarbons into lower hydrocarbons. There are a number of unresolved technical challenges faced by existing implementations, including handling more than one type of feedstock, rendering the process substantially continuous, determining a composition of a set of catalysts for optimal yield at lower cracking temperatures, delivery of feedstock into a cracking device, removal of residue from the cracking device, and tuning the quality and quantity of resulting end products. In addition, thermo-catalytic cracking poses a number of process design challenges, such as designing a cracking device to achieve optimal heat transfer area, selection of a heating medium, avoiding or reducing under-utilization of heat transfer area typically encountered in a batch processing mode due to depleting level of feedstock, effective removal of residue in the cracking device that can lead to poor heat transfer, and mitigating coke formation on a heat transfer surface of the cracking device. These challenges hinder the ability to scale up equipment size for commercially viable plants.

It is against this background that a need arose to develop the process for thermo-catalytic cracking and related devices and systems described herein.

SUMMARY

Certain aspects of the invention relate to a batch, semi-continuous, or substantially continuous process for the conversion of higher hydrocarbons into lower hydrocarbons. In one embodiment, the process includes: (a) providing a feedstock in the form of higher hydrocarbons and including at least one solid raw material and at least one liquid raw material and converting the feedstock into a liquid or a semi-liquid phase; (b) bringing a temperature of the feedstock to a prescribed level; (c) cracking the feedstock in the presence of a first set of catalysts at a temperature lower than a natural pyrolysis temperature of the feedstock; (d) evaporating the cracked feedstock into a gaseous phase; (e) restructuring the cracked feedstock in the gaseous phase in the presence of a second set of catalysts to produce a restructured gaseous product; (f) condensing the restructured gaseous product to produce a desired end product; and (g) removing unevaporated and uncracked residues. Other aspects of the invention relate to devices and systems for carrying out the conversion of higher hydrocarbons into lower hydrocarbons.

In another embodiment, the feedstock includes a mixture of the solid raw material and the liquid raw material.

In another embodiment, the solid raw material includes at least one of waste plastics, petroleum sludge, tar sand, used tires, and petroleum residue, and the liquid raw material includes at least one of used oil, vegetable oil, furnace oil, slope oil, heavy oil, and refinery residual oil.

In another embodiment, cracking the feedstock in (c) is carried out using a thin-film cracking device.

In another embodiment, the thin-film cracking device creates a thin film of the feedstock using at least one of wiping, spraying, falling film, rising film, and a roller mechanism.

In another embodiment, the thin-film cracking device includes the first set of catalysts in a coated form on surfaces that are in contact with the feedstock.

In another embodiment, the thin-film cracking device is configured to provide enhanced contact area between the first set of catalysts and the feedstock and enhanced heat transfer to the feedstock.

In another embodiment, the thin-film cracking device is configured to provide substantially continuous contact of the first set of catalysts with a heat transfer surface and with a thin film of the feedstock.

In another embodiment, the thin-film cracking device includes a mechanism to remove the cracked feedstock in the gaseous phase.

In another embodiment, restructuring the cracked feedstock in (e) is carried out using a catalytic converter including the second set of catalysts.

In another embodiment, the feedstock is pre-conditioned by at least one of removal of moisture and impurities, washing, dissolving, filtering, breaking, chopping, tearing, crushing, grinding, and pulverizing.

In another embodiment, converting the feedstock into the liquid or the semi-liquid phase in (a) is carried out using a vessel, and the pre-conditioned feedstock is transferred into the vessel by at least one of pressure, gravity, vacuum, pump, screw conveyor, and belt.

In another embodiment, the pre-conditioned feedstock in the vessel is converted into the liquid or the semi-liquid phase by at least one of heating, dissolving, emulsifying, and breaking.

In another embodiment, the feedstock is purged with an inert gas or a mixture of inert gases.

In another embodiment, the feedstock is purged with a material to improve reactivity of the feedstock.

In another embodiment, undesirable solids, liquids, and gases are removed from the feedstock by at least one of settling, vaporizing, and condensing.

In another embodiment, converting the feedstock into the liquid or the semi-liquid phase in (a) is carried out using a vessel, cracking the feedstock in (c) is carried out using a thin-film cracking device, and the feedstock is transferred from the vessel to the thin-film cracking device via a temperature controlled heating device.

In another embodiment, cracking the feedstock in (c) is carried out using a thin-film cracking device, and the first set of catalysts is provided in the thin-film cracking device by at least one of dosing, injecting, ejecting, providing the first set of catalysts as a liquid, a solid, or a slurry, suspending, retaining, and coating.

In another embodiment, the first set of catalysts is selected from silicates, oxides, carbides, hydroxides, carbonates of $Na^+$, $Ca^{2+}$, $Al^{3+}$, $Fe^{3+}$, $Co^{2+}$, $Ni^{2+}$, $Mn^{2+}$, $Zr^{4+}$, $Ti^{4+}$, $W^{6+}$, $Mg^{2+}$, $V^{2+}$, $Cr^{3+}$, $Sn^{4+}$, $Zn^{2+}$, $Ce^{4+}$, $Li^+$, $K^+$, $Mo^{3+}$, $Cu^{2+}$, $Si^{4+}$, $Cd^{2+}$, and $Ba^{2+}$, metals of Ag, Pt, and Au, natural and synthetic zeolites, Fuller's earth, activated charcoal, mixtures of the above, and nanoparticles or powders of the above.

In another embodiment, the feedstock in the thin-film cracking device is heated in the presence of the first set of catalysts to a level sufficient to crack the feedstock and evaporate the cracked feedstock.

In another embodiment, cracking the feedstock in (c) is carried out using a thin-film cracking device, and removing unevaporated and uncracked residues in (g) includes transferring the residues in the thin-film cracking device to a bottom of the thin-film cracking device.

In another embodiment, the residues are transferred from the bottom of the thin-film cracking device to a residue receiver vessel.

In another embodiment, at least a portion of the residues is transferred from the residue receiver vessel to a separate vessel via a temperature controlled device.

In another embodiment, evaporating the cracked feedstock in (d) is controlled by a pressure and temperature control device.

In another embodiment, restructuring the cracked feedstock in (e) is carried out using a catalytic converter including the second set of catalysts, and the catalytic convertor is configured for molecular restructuring of the cracked feedstock.

In another embodiment, cracking the feedstock in (c) is carried out using a thin-film cracking device, and at least a portion of the restructured gaseous product is transferred back to the thin-film cracking device.

In another embodiment, the second set of catalysts includes multiple catalysts that are provided in the catalytic converter.

In another embodiment, the second set of catalysts is provided in the catalytic converter by at least one of dosing, injecting, ejecting, providing the second set of catalysts as a liquid, a solid, or a slurry, suspending, retaining, and coating.

In another embodiment, the second set of catalysts is selected from silicates, oxides, carbides, hydroxides, carbonates of $Na^+$, $Ca^{2+}$, $Al^{3+}$, $Fe^{3+}$, $Co^{2+}$, $Ni^{2+}$, $Mn^{2+}$, $Zr^{4+}$, $Ti^{4+}$, $W^{6+}$, $Mg^{2+}$, $V^{2+}$, $Cr^{3+}$, $Sn^{4+}$, $Zn^{2+}$, $Ce^{4+}$, $Li^+$, $K^+$, $Mo^{3+}$, $Cu^{2+}$, $Si^{4+}$, $Cd^{2+}$, and $Ba^{2+}$, metals of Ag, Pt, and Au, natural and synthetic zeolites, Fuller's earth, activated charcoal, mixtures of the above, and nanoparticles or powders of the above.

In another embodiment, condensing the restructured gaseous product in (f) is carried out using a fractionating column to achieve separation of the desired end product by condensation through controlled temperature and pressure.

In another embodiment, the desired end product includes a set of lower hydrocarbons in liquid form.

In another embodiment, the desired end product includes a set of uncondensed gases.

In another embodiment, at least a portion of a condensate is transferred back to the fractionating column for finer separation.

In another embodiment, at least a portion of a condensate is transferred to a storage vessel via a temperature controlled cooling device.

In another embodiment, uncondensed gases are passed through a scrubbing device.

In another embodiment, the scrubbed gases are transferred to a storage vessel through controlled temperature and pressure.

In another embodiment, the storage vessel includes a pressure vessel or a tank.

In another embodiment, the storage vessel is maintained at a desired pressure and a desired temperature by a controller.

In another embodiment, at least a portion of the scrubbed gases is transferred from the storage vessel to a flaring device.

In another embodiment, at least a portion of the scrubbed gases is transferred from the storage vessel to a heating device for use as a fuel.

Embodiments of the invention address a number of previously unresolved technical challenges and provide a number of benefits, including:

(1) handling a variety of feedstocks, including mixtures of liquid raw materials and solid raw materials, in one process and one system;

(2) performing thermo-catalytic cracking at a lower temperature than a natural pyrolysis temperature of a particular hydrocarbon;

(3) implementing devices and systems to carry out a substantially continuous process that can achieve thermo-catalytic cracking of a variety of feedstocks, including those in mixture form;

(4) implementing devices and systems to carry out a process having a higher rate of heat transfer and fuller utilization of heat transfer surface, while retaining all three components, namely feedstock, heat transfer surface, and a set of catalysts, in close contact;

(5) efficiently removing undesired impurities and moisture;

(6) pre-conditioning of feedstock for controlled dosing;

(7) improving heat transfer capacity of feedstock;

(8) implementing devices and systems having at least one of the following features:

controlled and substantially continuous dosing of feedstock into a cracking device substantially continuous utilization of most, or all, of a heat transfer surface of the cracking device achieving optimum flow rate or velocity of feedstock over the heat transfer surface substantially continuous removal of residues from the cracking device substantially continuous removal of lower hydrocarbon vapors and off-gases from the cracking device controlled pressure and temperature environment in the cracking device higher cracking rate achieved in the cracking device structurally reforming cracked hydrocarbons to improve the quality of a resulting end product providing different catalyst compositions and strengths of catalysts at different stages of catalytic conversion Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Definitions

Figure 1:
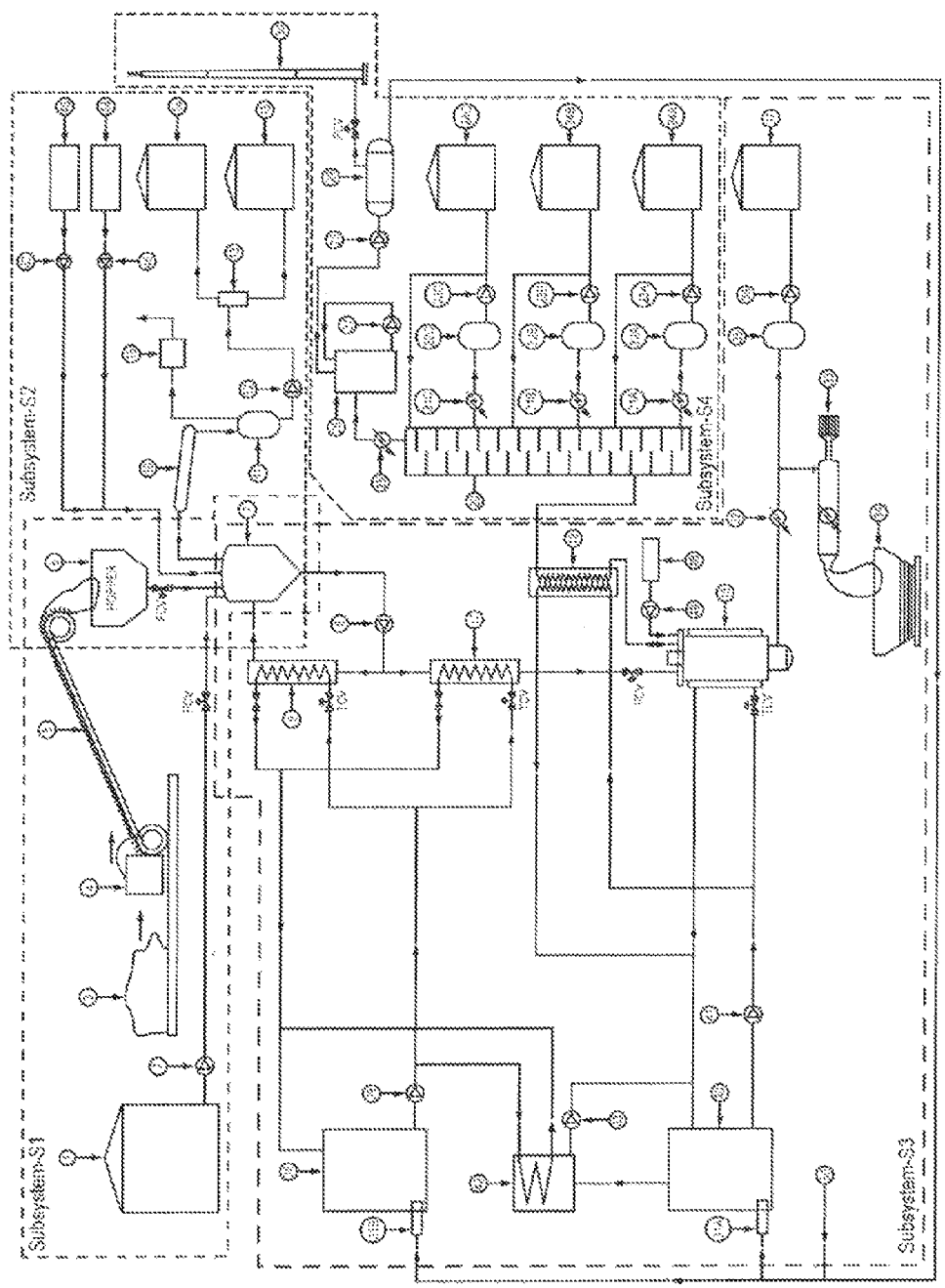
FIG. 1 is a schematic overview of a thermo-catalytic cracking system including four main subsystems denoted by boxes with dashed lines, according to an embodiment of the invention.

The following definitions apply to some of the aspects described with respect to some embodiments of the invention. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common characteristics.

As used herein, the term "adjacent" refers to being near or adjoining. Adjacent objects can be spaced apart from one another or can be in actual or direct contact with one another. In some instances, adjacent objects can be connected to one another or can be formed integrally with one another.

As used herein, relative terms, such as "inner," "interior," "outer," "exterior," "top," "bottom," "front," "back," "upper," "upwardly," "lower," "downwardly," "vertical," "vertically," "lateral," "side," "laterally," "above," and "below," refer to an orientation of a set of objects with respect to one another, such as in accordance with the drawings, but do not require a particular orientation of those objects during manufacturing or use.

As used herein, the terms "connect," "connected," and "connection" refer to an operational coupling or linking. Connected objects can be directly coupled to one another or can be indirectly coupled to one another, such as through another set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the term "hydrocarbon" refers to an alkane, an alkene, an alkyne, an arene, or a combination thereof. The term "lower hydrocarbon" refers to a lower form of an alkane, an alkene, an alkyne, an arene, or a combination thereof, while the term "higher hydrocarbon" refers to a higher form of an alkane, an alkene, an alkyne, an arene, or a combination thereof.

As used herein, the term "alkane" refers to a saturated hydrocarbon molecule. The term "lower alkane" refers to an alkane that includes from 1 to 25 carbon atoms, such as from 8 to 25 carbon atoms, while the term "higher alkane" refers to an alkane that includes more than 25 carbon atoms, such as from 25 to 100 carbon atoms. The term "branched alkane" refers to an alkane that includes a set of branches, while the term "unbranched alkane" refers to an alkane that is straight-chained. The term "cycloalkane" refers to an alkane that includes a set of ring structures, such as a single ring structure or a bicyclo or higher order cyclic structure. The term "heteroalkane" refers to an alkane that has a set of its carbon atoms replaced by a set of heteroatoms, such as N, Si, S, O, and P. The term "substituted alkane" refers to an alkane that has a set of its hydrogen atoms replaced by a set of substituent groups, while the term "unsubstituted alkane" refers to an alkane that lacks such replacement. Combinations of the above terms can be used to refer to an alkane having a combination of characteristics. For example, the term "branched lower alkane" can be used to refer to an alkane that includes from 1 to 25 carbon atoms and a set of branches.

As used herein, the term "alkene" refers to an unsaturated hydrocarbon molecule that includes a set of carbon-carbon double bonds. The term "lower alkene" refers to an alkene that includes from 2 to 25 carbon atoms, such as from 8 to 25 carbon atoms, while the term "higher alkene" refers to an alkene that includes more than 25 carbon atoms, such as from 25 to 100 carbon atoms. The term "cycloalkane" refers to an alkene that includes a set of ring structures, such as a single ring structure or a bicyclo or higher order cyclic structure. The term "heteroalkene" refers to an alkene that has a set of its carbon atoms replaced by a set of heteroatoms, such as N, Si, S, O, and P. The term "substituted alkene" refers to an alkene that has a set of its hydrogen atoms replaced by a set of substituent groups, while the term "unsubstituted alkene" refers to an alkene that lacks such replacement. Combinations of the above terms can be used to refer to an alkene having a combination of characteristics. For example, the term "substituted lower alkene" can be used to refer to an alkene that includes from 2 to 25 carbon atoms and a set of substituent groups.

As used herein, the term "alkyne" refers to an unsaturated hydrocarbon molecule that includes a set of carbon-carbon triple bonds. In some instances, an alkyne can also include a set of carbon-carbon double bonds. The term "lower alkyne" refers to an alkyne that includes from 2 to 25 carbon atoms, such as from 8 to 25 carbon atoms, while the term "higher alkyne" refers to an alkyne that includes more than 25 carbon atoms, such as from 25 to 100 carbon atoms. The term "cycloalkyne" refers to an alkyne that includes a set of ring structures, such as a single ring structure or a bicyclo or higher order cyclic structure. The term "heteroalkyne" refers to an alkyne that has a set of its carbon atoms replaced by a set of heteroatoms, such as N, Si, S, O, and P. The term "substituted alkyne" refers to an alkync that has a set of its hydrogen atoms replaced by a set of substituent groups, while the term "unsubstituted alkyne" refers to an alkyne that lacks such replacement. Combinations of the above terms can be used to refer to an alkync having a combination of characteristics. For example, the term "substituted lower alkyne" can be used to refer to an alkync that includes from 2 to 25 carbon atoms and a set of substituent groups.

As used herein, the term "arene" refers to an aromatic hydrocarbon molecule. The term "lower arene" refers to an arene that includes from 5 to 25 carbon atoms, such as from 8 to 25 carbon atoms, while the term "higher arene" refers to an arene that includes more than 25 carbon atoms, such as from 25 to 100 carbon atoms. The term "monocyclic arene" refers to an arene that includes a single aromatic ring structure, while the term "polycyclic arene" refers to an arene that includes more than one aromatic ring structure, such as two or more aromatic ring structures that are bonded via a carbon-carbon bond or that are fused together. The term "heteroarene" refers to an arene that has a set of its carbon atoms replaced by a set of heteroatoms, such as N, Si, S, O, and P. The term "substituted arene" refers to an arene that has a set of its hydrogen atoms replaced by a set of substituent groups, while the term "unsubstituted arene" refers to an arene that lacks such replacement. Combinations of the above terms can be used to refer to an arene having a combination of characteristics. For example, the term "monocyclic lower arene" can be used to refer to an arene that includes from 5 to 25 carbon atoms and a single aromatic ring structure.

Overview of Process for Conversion of Higher Hydrocarbons into Lower Hydrocarbons Described as follows is a process for the conversion of higher hydrocarbons, such as in the form of waste plastics, petroleum sludge, slope oil, vegetable oil, and so forth, into lower hydrocarbons. The lower hydrocarbons can be produced in the form of liquids, gases, solids, or combinations thereof, and can be used for a variety of applications, such as raw materials for industrial applications, fuels for industrial and domestic applications, and raw materials for petroleum-based products. Advantageously, the process can be carried out in a substantially continuous manner for improved efficiency and throughput, thereby rendering the process suitable for implementation in commercially viable plants. However, it is also contemplated that the process can be carried out in a batch manner or a semi-continuous manner.

In one embodiment, the process is carried out via the following operations. It should be recognized that certain of the following operations can be omitted, combined, subdivided, or re-ordered.

In one operation, a feedstock including a set of raw materials is provided and pre-conditioned to render it suitable for further processing, such as by removal of moisture and impurities, dissolving, filtering, breaking, chopping, tearing, crushing, grinding, pulverizing, staining, heating or cooling, control of pressure, purging with gases, liquids, or solids, or combinations thereof. The feedstock, either before or subsequent to pre-conditioning, can include higher hydrocarbons in the form of liquids, a slurry, solid lumps, blocks, sheets, pieces, powders, particulates, flakes, gases, or combinations thereof. In certain implementations, the feedstock includes at least one solid raw material and at least one liquid raw material. The solid raw material can include waste plastics, petroleum sludge, tar sand, used tires, rubber products, petroleum residue, or combinations thereof, and the liquid raw material can include used oil, vegetable oil, furnace oil, slope oil, heavy oil, refinery residual oil, synthetic oil, edible oil, or combinations thereof. Pre-conditioning is carried out to achieve one or more of the following: (a) segregation of moisture and impurities, such as metals, sand, mud, clay, and wood; (b) decrease in viscosity and improve flowability of the feedstock; (c) improve thermal conductivity of the feedstock; and (d) improve an effective surface area of the feedstock for improved heat transfer.

In another operation, the pre-conditioned feedstock is conveyed to a vessel, which can be referred as a melting vessel or chamber, by application of pressure, application of gravity, application of vacuum, pumps, screw conveyors, belts, magnetic devices, vibrating devices, combinations thereof, or any other mechanism for conveyance. The conveyance of feedstock can be controlled to achieve a desired throughput and a desired level of the feedstock in the melting vessel. This can be achieved using a controller, which can be mechanical, electrical, pneumatic, hydraulic, electronic, or combinations thereof. The melting vessel can include a mechanism to achieve stirring, heating, cooling, flashing, atomizing, or combinations thereof. The melting vessel can also include a mechanism to achieve recirculation of material, evaporation, condensation, refluxing, or combinations thereof. The melting vessel can have a variety of shapes, such as circular, conical, rectangular, square, cylindrical, annular, tubular, jacketed, or combinations thereof. Stirring in the melting vessel can be achieved by a variety of mechanisms, such as mechanical, electrical, pneumatic, hydraulic, or combinations thereof. The melting vessel can include a single vessel or multiple vessels that are interconnected or used independently.

In another operation, the feedstock is processed in the melting vessel to convert it into a liquid or scmi-liquid phase or to reduce its viscosity, such as by heating, dissolving, emulsifying, breaking, purging, or combinations thereof. In certain implementations, the feedstock includes at least one solid raw material and at least one liquid raw material, and the solid raw material is dissolved or merged with the liquid raw material in a heated form, such as at a temperature in the range of about 150° C. to about 250° C. or about 175° C. to about 225° C. and at about atmospheric pressure. Dissolving is carried out to achieve one or more of the following: (a) decrease in viscosity and improve flowability of the feedstock; (b) improve thermal conductivity of the feedstock; and (c) improve an effective surface area of the feedstock for improved heat transfer. A resulting solid/liquid mixture of desired proportions yields a liquid or liquid slurry, which can be kept in circulation and delivered for subsequent processing in a controlled and substantially continuous manner.

In another operation, the feedstock is purged with nitrogen or another inert gas or with a mixture of inert gases to substantially remove and replace oxygen from the melting vessel. Alternatively, or in conjunction, the feedstock is purged with a suitable material, such as a suitable gas or liquid, to improve reactivity of the feedstock with respect to subsequent thermo-catalytic cracking. Purging can be achieved by injection, blowing, bubbling, mixing, or combinations thereof.

In another operation, undesirable materials, such as in the form of solids, liquids, gases, or combinations thereof, are removed from the feedstock in a pressure and temperature controlled environment by a suitable mechanism, such as by settling, vaporizing, condensing, filtering, chemical reaction, coalescing, adsorption, or combinations thereof. The pressure controlled environment can be achieved by, for example, a blower, a vacuum pump, or combinations thereof, along with a controller. The temperature controlled environment can be achieved by, for example, a long tube evaporator, a condenser, a radiator, or combinations thereof, along with a controller.

In another operation, the feedstock is conveyed from the melting vessel to a cracking device, which can be referred as a cracking vessel or chamber, via a temperature controlled heating device. Conveyance to the cracking device can be achieved by, for example, a direct or indirect heat exchanger along with a controller. The feedstock in the form of a liquid or liquid slurry can be kept in circulation in the heat exchanger and delivered to the cracking device in a controlled and substantially continuous manner. This liquid or liquid slurry under circulation is desirably maintained in a turbulent zone where Reynolds numbers are in the range of about 5,000 to about 20,000 or about 8,000 to about 15,000 for efficient heat transfer and to avoid or reduce hot spots and localized charring of hydrocarbon. This turbulent zone can be achieved by measuring a velocity or a flow rate of the feedstock through the heat exchanger and using viscosity and density data tabulated for a variety of feedstock composition and associated temperature ranges. The flow rate can be measured by, for example, a flow meter, and can be controlled through speed control of a pump.

In another operation, a set of catalysts is provided in the cracking device, such as by dosing into the cracking device or making the catalysts available in the cracking device by any other mechanism. For example, the catalysts can be provided in the cracking device by injecting, ejecting, providing as a liquid, a solid, or a slurry, suspending or retaining in the cracking device, coating on any surface or surfaces of the cracking device, or combinations thereof. Examples of suitable catalysts for thermo-catalytic cracking include silicates, oxides, carbides, hydroxides, carbonates of $Na^+$, $Ca^{2+}$, $Al^{3+}$, $Fe^{3+}$, $Co^{2+}$, $Ni^{2+}$, $Mn^{2+}$, $Zr^{4+}$, $Ti^{4+}$, $W^{6+}$, $Mg^{2+}$, $V^{2+}$, $Cr^{3+}$, $Sn^{4+}$, $Zn^{2+}$, $Ce^{4+}$, $Li^+$, $K^+$, $Mo^{3+}$, $Cu^{2+}$, $Si^{4+}$, $Cd^{2+}$, and $Ba^{2+}$, metals of Ag, Pt, Au, and transition metals, natural and synthetic zeolites, Fuller's earth, activated charcoal, mixtures of the above, and nanoparticles or powders of the above. For certain implementations, a desirable amount of the catalysts can be in the range of about 0.05% to about 10% by weight or about 0.1% to about 3% by weight, relative to an amount of the feedstock included in the cracking device. The catalysts can be selected by, for example, selecting a particular combination of the catalysts by weight or by volume and selecting particular chemical compositions and particular shapes of the catalysts in the form of powder, lumps, granules, globules, nanoparticles, coatings, and so forth. For certain implementations, a desirable composition and proportion of the catalysts are as follows: about 5-45% by weight of a set of silicates, about 0-45% by weight of a set of zeolites, about 0-15% by weight of a set of transition metals, about 0-10% by weight of a set of metal carbides, about 0-55% by weight of a set of metal oxides, about 0-15% by weight of a set of metal hydroxides, and about 0-55% by weight of a set of metal carbonates.

In another operation, the feedstock is heated in the cracking device and in the presence of the catalysts to a level sufficient to crack the feedstock and evaporate resulting products. Advantageously, heating can be carried out at a temperature lower than a natural pyrolysis temperature of the feedstock, such as at a temperature in the range of about 275° C. to about 500° C. or about 325° C. to about 425° C. and at about atmospheric pressure. Heating can involve supplying heat to the cracking device using a heating medium or source, such as molten salt in close circulation, electrical heating, thermal oil system (or any other thermal liquid system), steam, flue gases, induction heating, microwave, or combinations thereof, along with a controller.

In another operation, uncracked and unevaporated residues in the cracking device are conveyed to a bottom of the cracking device by, for example, gravity, wiping, augur, rotary air lock valve, screw conveyor, or combinations thereof. The residues are conveyed from the cracking device to a residue receiver vessel, and then conveyed from the residue receiver vessel to a separate storage vessel via a temperature controlled device, such as by heating or cooling the residues using a heat exchanger, a radiator, or combinations thereof, along with a controller.

In another operation, cracked and evaporated feedstock is conveyed from the cracking device to a catalytic convertor for molecular restructuring into desired products. Conveyance of the cracked and evaporated feedstock to the catalytic convertor can be achieved by, for example, suction through a duct, a pipe, or a tube, pressure, or combinations thereof, along with a controller. A set of catalysts is provided in the catalytic converter, such as by dosing into the catalytic converter or making the catalysts available in the catalytic converter by any other mechanism. For example, the catalysts can be provided in the catalytic converter by injecting, ejecting, providing as a liquid, a solid, or a slurry, suspending or retaining in the catalytic converter, coating on any surface or surfaces of the catalytic converter, or combinations thereof. Examples of suitable catalysts for molecular restructuring include silicates, oxides, carbides, hydroxides, carbonates of $Na^+$, $Ca^{2+}$, $Al^{3+}$, $Fe^{3+}$, $Co^{2+}$, $Ni^{2+}$, $Mn^{2+}$, $Zr^{4+}$, $Ti^{4+}$, $W^{6+}$, $Mg^{2+}$, $V^{2+}$, $Cr^{3+}$, $Sn^{4+}$, $Zn^{2+}$, $Ce^{4+}$, $Li^+$, $K^+$, $Mo^{3+}$, $Cu^{2+}$, $Si^{4+}$, $Cd^{2+}$, and $Ba^{2+}$, metals of Ag, Pt, Au, and transition metals, natural and synthetic zeolites, Fuller's earth, activated charcoal, mixtures of the above, and nanoparticles or powders of the above. Any remaining unstructured or heavy hydrocarbons can be transferred back to the cracking device for further cracking.

In another operation, a resulting restructured product in a gas form is conveyed from the catalytic converter to a fractionating column to separate desired end products by condensation through controlled temperature and pressure. The restructured product in the gas form can include hydrocarbon vapors, along with additional vapors of water or additional liquids and gases. For certain implementations, a portion of a resulting condensate can be conveyed back to the fractionating column for finer separation, such as by refluxing of different condensates available from the fractionating column or any other liquid back to the fractionating column to achieve desired fractions.

In another operation, the condensate is conveyed to a storage vessel or chamber via a temperature controlled cooling device, such as by sub-cooling the condensate to a desired level for transferring and storing the condensate under safe conditions. Conveyance can be achieved using, for example, a heat exchanger, a radiator, or combinations thereof, along with a controller.

In another operation, uncondensed gases, which can include off gases, are passed through a scrubbing device. Resulting scrubbed gases are next conveyed to a storage vessel or chamber through controlled temperature and pressure, such as using a pressure regulating valve, a pressure control valve, a rupture disc, or combinations thereof, along with a controller. The storage vessel can include a pressure vessel or a tank, which is maintained at a desired pressure and a desired temperature by the controller. Excess gases from the storage vessel can be released to a flaring device. For certain implementations, a desired amount of gases can be conveyed from the storage vessel to a heating device for use as a fuel under controlled conditions, such as in connection with certain operations described above. Conveyance of the desired amount of gases can be achieved through controlled temperature and pressure, such as using a pressure regulating valve, a gas train, a governor, or combinations thereof, along with a controller.

Devices and Systems for Conversion of Higher Hydrocarbons into Lower Hydrocarbons One of a variety of thermo-catalytic cracking systems for converting higher hydrocarbons into lower hydrocarbons is illustrated in FIG. 1 through FIG. 5 and is described in the following in accordance with an embodiment of the invention.

Figure 2:
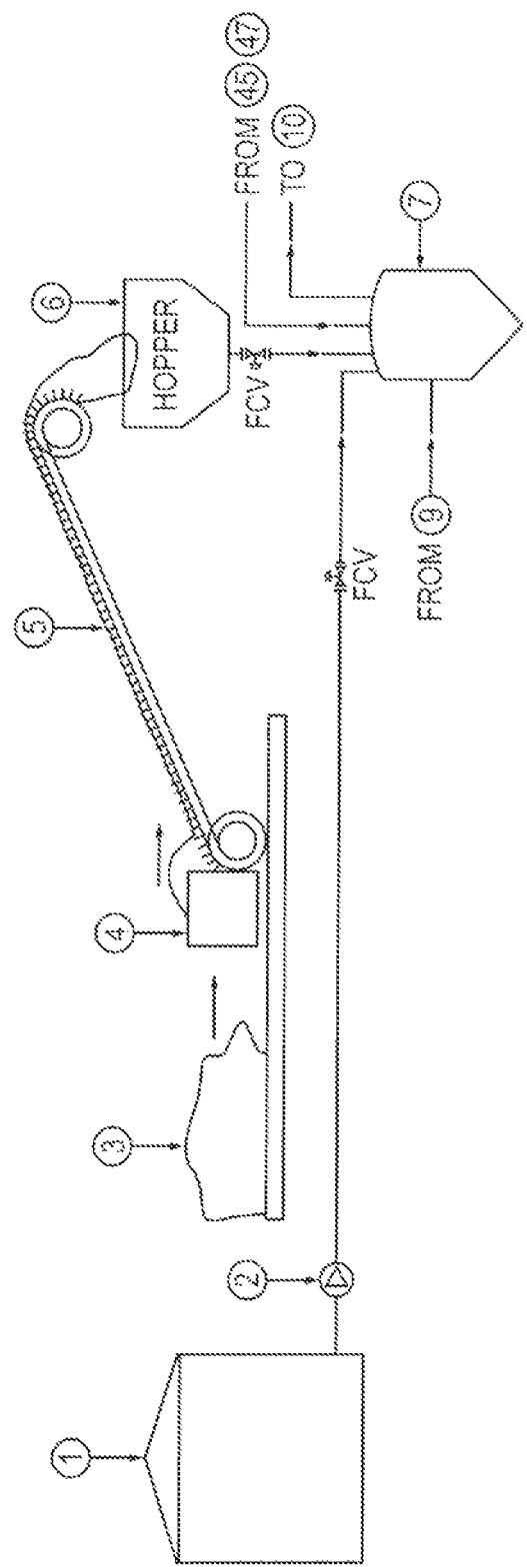
FIG. 2 is an enlarged view of subsystem-S1 of FIG. 1, which primarily carries out operations related to pre-treatment and transportation of feedstock in accordance with an embodiment of the invention.

Referring first to FIG. 2, liquid hydrocarbon raw materials are stored in a storage tank or container 1, and a horizontal variable speed conveyor moves solid hydrocarbon raw materials from a storage bin or stockpile 3 to a crusher 4. The crusher 4 reduces sizes of over-sized solids into a desired size, such as on the order of a few centimeters or a few millimeters. An inclined chain conveyor 5 next conveys the sized-reduced solid materials from the crusher 4 to a hopper 6. Issues related to dust are expected to be minimal, as mechanized conveyors are used instead of pneumatic ones. Also a dust collector associated with the crusher 4 can further ensure dust-free or dust-reduced operation. In the illustrated embodiment, a pump 2 conveys the liquid materials, via a flow control device FCV, from the storage tank 1 to a hold-up vessel 7, which acts as a vapor-liquid separation chamber.

Figure 4:
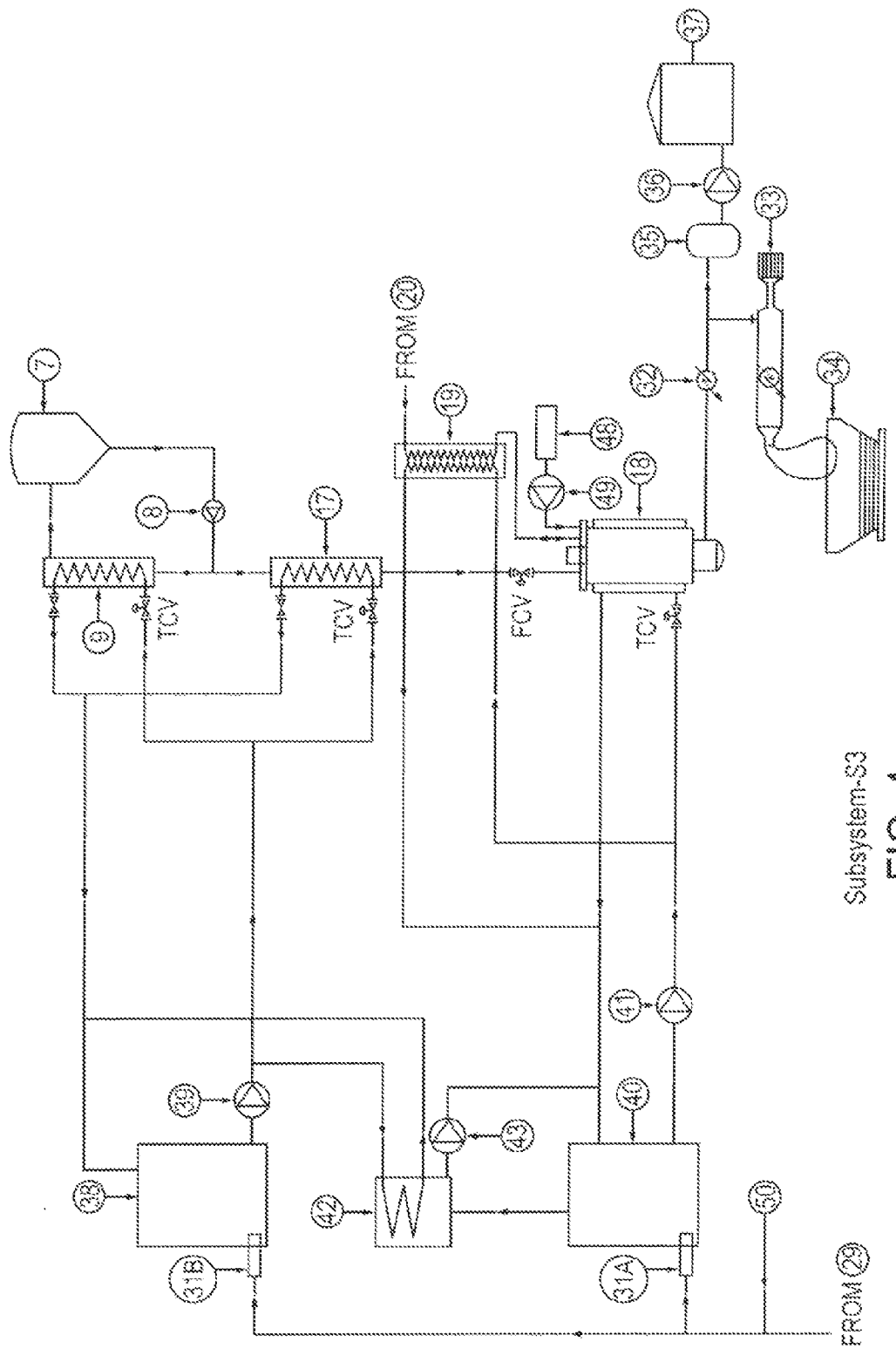
FIG. 4 is an enlarged view of subsystem-S3 of FIG. 1, which primarily carries out operations related to thermo-catalytic cracking and restructuring in accordance with an embodiment of the invention.
Figure 5:
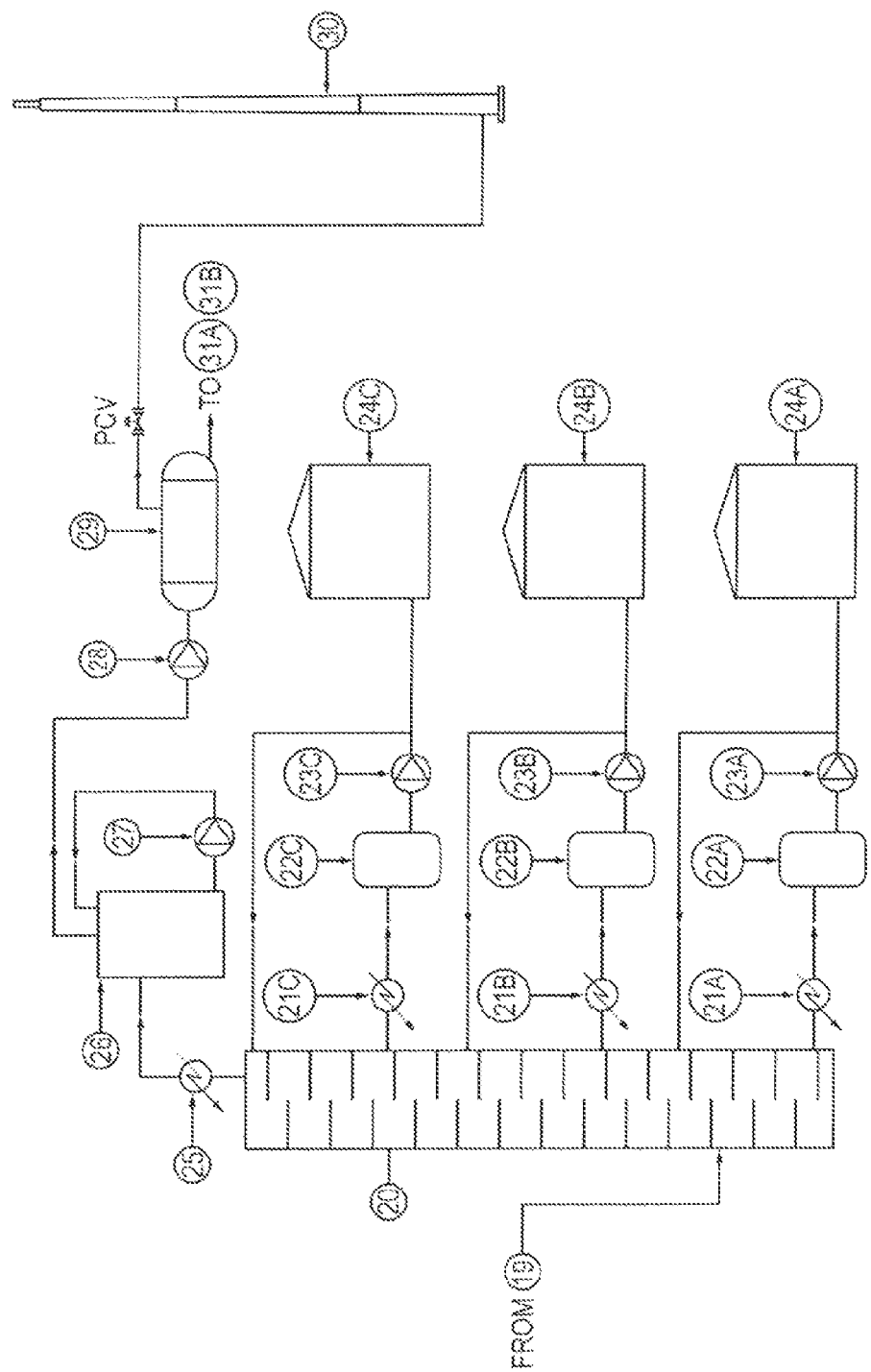
FIG. 5 is an enlarged view of subsystem-S4 of FIG. 1, which primarily carries out operations related to fractionation, condensation, and extraction of various categories of fuels in accordance with an embodiment of the invention.

As illustrated in FIG. 2 and FIG. 4, the vessel 7 along with an external tubular vertical heat exchanger 9 form a long tube recirculation evaporator of the rising film type. A recirculation pump 8 ensures that the liquid materials are in substantially constant circulation through tubes at an appropriate velocity for efficient transfer of heat with little or no hot spots. The liquid materials are heated to a temperature of about 240° C. by hot thermal oil generated by a thermal oil heater 38 and circulated by a pump 39 through a shell side of the heat exchanger 9. However, the temperature can vary depending on the type of solid and liquid materials, and can be adjusted using a temperature control valve TCV. A primary heat source for the thermal oil heater 38 are off gases stored in a vessel 29, which is illustrated in FIG. 5, optionally supplemented by fuel from another source. The off gases, along with any supplemented fuel, are fired into the thermal oil heater 38 by a burner 31B.

The long tube recirculation evaporator creates a hot pool of liquid hydrocarbon, and the solid materials that have undergone size reduction are introduced into the vessel 7, via a flow control device FCV, where the solid materials are merged with the hot pool of liquid hydrocarbon and are substantially dissolved therein. This solid/liquid mixture of desired proportions yields a liquid or liquid slurry, which can be kept in circulation via the recirculation pump 8 through the heat exchanger 9 and the vessel 7. Viscosity of this liquid or liquid slurry is maintained such that its flow rate or velocity through the heat exchanger 9 is in a turbulent region to enhance heat transfer. To maintain the desired viscosity, a temperature and a composition of this liquid or liquid slurry are automatically adjusted by control devices TCV. To maintain the desired turbulence in the heat exchanger 9, a capacity of the recirculation pump 8 can be modulated by speed control. Control over proportions of solids/liquids, temperatures, and capacity modulation of the recirculation pump 8 provides desirable pre-conditioning of the feedstock to initiate thermo-catalytic cracking.

Figure 3:
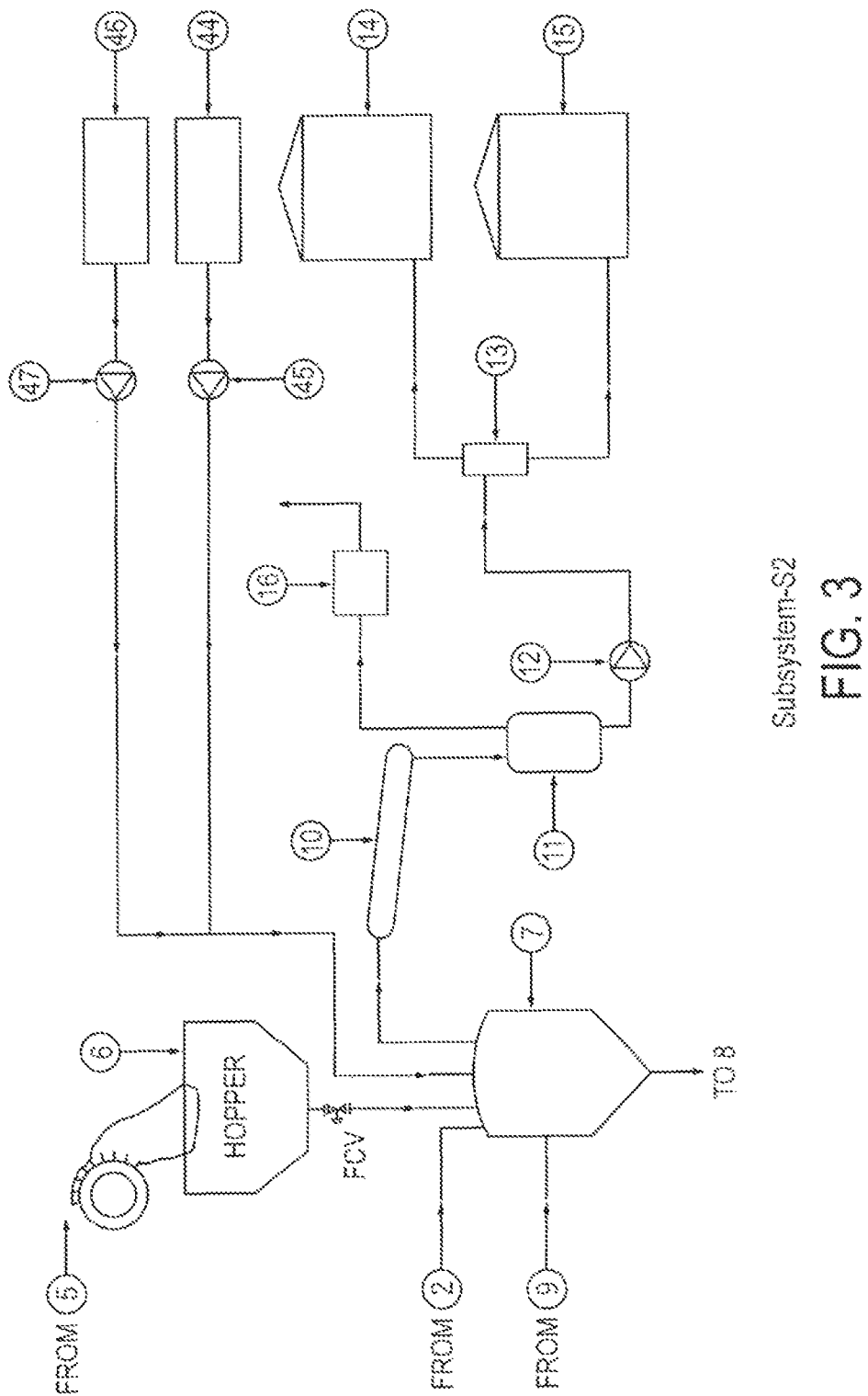
FIG. 3 is an enlarged view of subsystem-S2 of FIG. 1, which primarily carries out operations related to dehydration and removal of lower hydrocarbons from feedstock in accordance with an embodiment of the invention.

Referring to FIG. 3, an inert gas or a mixture of inert gases from a container 44 is conveyed by a pump 45 into the vessel 7 to maintain a substantially oxygen-free atmosphere in the vessel 7. A rate of pumping is controlled by a control device (not illustrated). Addition of an inert gas is desirable at or near the beginning of the process to avoid or reduce oxidation. A reactive gas or liquid in a container 46 is conveyed by a pump 47 into the vessel 7 in adequate quantity to promote cracking of different types of hydrocarbons.

Water vapors and vapors of hydrocarbons with carbon chain distribution in the range of C1 to C13 are liberated from the vessel 7, and are cooled in a condenser 10. Gases of lighter fractions shorter than C4 and non-condensable gases are separated in a reflux drum 11, which is connected to an incinerator 16, where these gases are flared, bottled, or used as fuel for heaters. Condensed liquid including water and hydrocarbons with carbon chain distribution between C5 and C13 is conveyed by a pump 12 to a vessel 13, where separation occurs through differences in densities. Separated fractions are then conveyed to respective storage tanks 14 and 15.

Referring to FIG. 4, unevaporated liquid, which is at about 240° C. and includes primarily higher fractions with carbon chain distribution in the range of C14 to C50 or even higher, passes to a heat exchanger 17 and is heated to about 340° C. by hot thermal oil. However, the temperature can vary depending on the type of hydrocarbons and their relative proportions.

A liquid or liquid slurry exiting the heat exchanger 17 is conveyed to a cracking device 18 in a controlled and substantially continuous manner using a flow control device FCV. The cracking device 18 is designed with a number of advantageous features, including being equipped with a rotating device that ensures uniform transfer of pre-heated liquid hydrocarbon onto a heat transfer surface of the cracking device 18. The design of the cracking device 18 allows cracking on a microscopic level by creating a very thin and substantially continuous film of the liquid or liquid slurry feedstock in intimate contact with a set of catalysts and with the heat transfer surface, such that thermo-catalytic cracking occurs in the thin film in an efficient manner. For example, the thin film of the liquid or liquid slurry feedstock can have a thickness in the range of about 10 nm to about 5 mm, in the range of about 100 nm to about 1 mm, or in the range of about 1 µm to about 1 mm. In conjunction, uncracked residues are conveyed to a bottom of the cracking device 18, such that the heat transfer surface is substantially continuously renewed for microscopic level cracking of additional liquid or liquid slurry feedstock that is introduced into the cracking device 18. In such manner, the design of the cracking device 18 allows substantially continuous cracking of a mixture of solid and liquid hydrocarbons, without requiring switching of multiple cracking devices or the use of standby cracking devices.

Figure 6A:
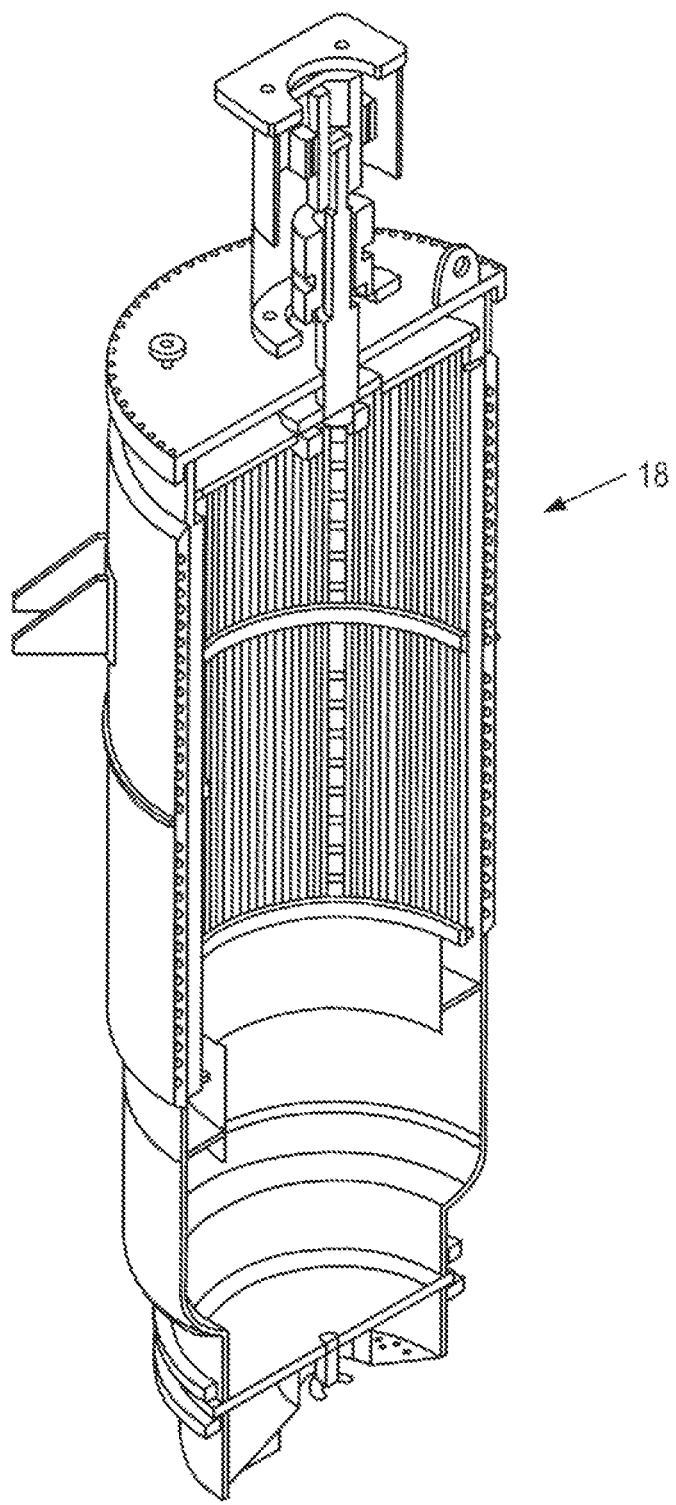
FIG. 6A, FIG. 6B, and FIG. 6C illustrate a thin-film cracking device implemented in accordance with an embodiment of the invention.
Figure 6B:
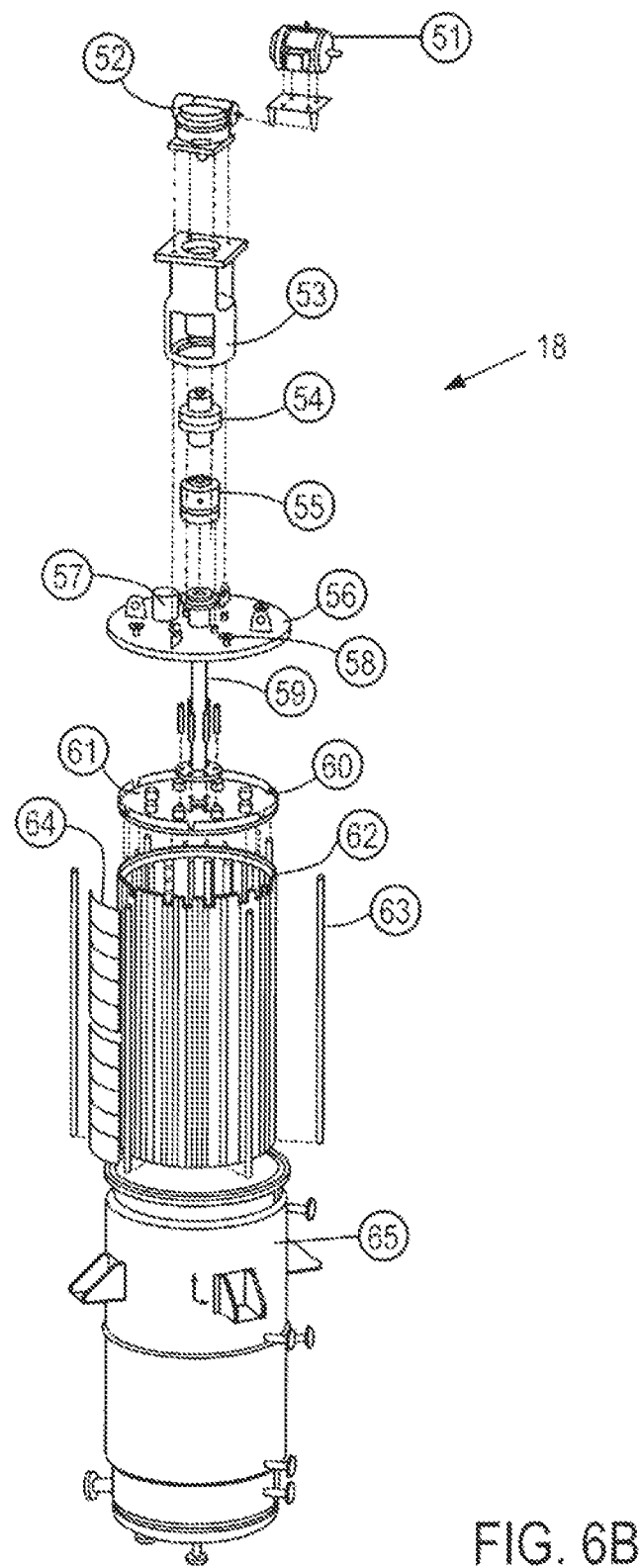

One of a variety of implementations for the cracking device 18 is illustrated in FIG. 6A and FIG. 6B and is described in the following in accordance with an embodiment of the invention.

The cracking device 18 illustrated in FIG. 6A and FIG. 6B is a thin-film cracking device and includes a jacketed vessel or housing 65, which houses a rotating fan-like structure 62 that can be referred as a blade assembly. The blade assembly 62 is part of a rotor, which also includes a rotor shaft 59, a top disk 60, a set of wiping blades 63, and a flash guard 64. The rotor is driven by a motor 51, which is connected to the rotor shaft 59 through a gearbox 52, a coupler 54, and a mechanical seal 55. A housing 53 encloses the coupler 54 and the seal 55. A top plate or lid 56 provides top covering for the jacketed vessel 65. In one aspect of the illustrated embodiment, the blade assembly 62 includes an assembly of channel/angle beams in a substantially circular shape with particular orientation, spacing, and quantity of the beams to yield a fan-like structure. One purpose of the blade assembly 62 is to provide suction for vapors formed during catalyst-assisted cracking of feedstock, which occurs on an internal surface of the jacketed vessel 65 and in an annular region between the jacketed vessel 65 and the blade assembly 62. The blade assembly 62 also houses the wiping blades 63 that are implemented with particular material, size, shape, and number. The wiping blades 63 can slide freely in a radial direction (relative to an axis extending between the top and the bottom of the jacketed vessel 65) under centripetal force generated by rotation of the blade assembly 62. During rotation, the wiping blades 63 are forced against the internal surface of the jacketed vessel 65. In such manner, the wiping blades 63 can substantially continuously wipe feedstock droplets splashed on the internal surface of the jacketed vessel 65. This wiping action of the blades 63 under pressure maintains a thin film of feedstock on the internal surface of the jacketed vessel 65.

Figure 6C:
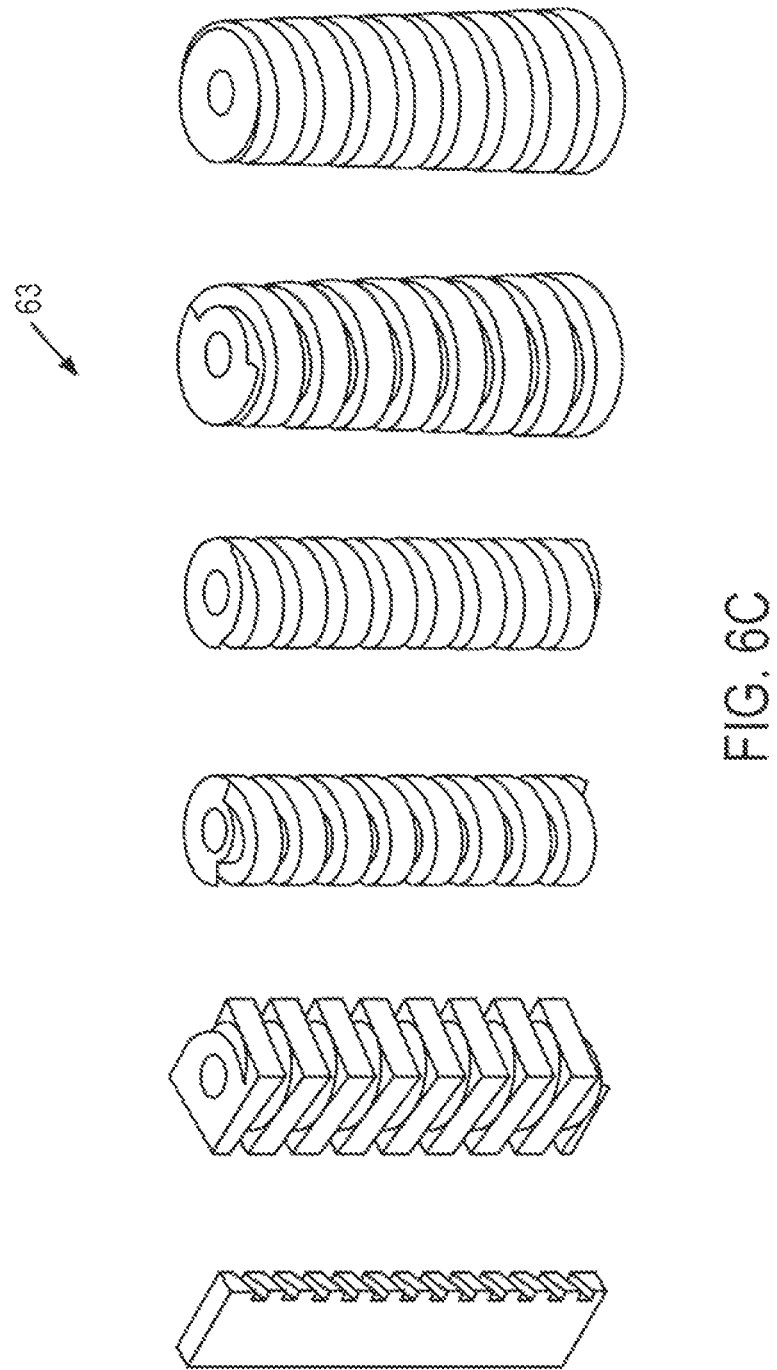

Still referring to FIG. 6A and FIG. 6B, a molten or liquefied feedstock is delivered into the jacketed vessel 65 through a set of nozzles 58. This liquid or semi-liquid feedstock falls on the top disk 60, which has a side wall with V-shaped notches. The feedstock is delivered onto the internal surface of the jacketed vessel 65 through a spilling or splashing mechanism through these V-shaped notches under centripetal force. A variety of other designs can be used in place of, or in conjunction with, these V-shaped notches, such as slots, slits, holes, and so forth. Once deposited on the internal surface of the jacketed vessel 65, the feedstock is substantially continuously wiped in a generally upward direction by the wiping blades 63. Various implementations for the wiping blades 63 are illustrated in FIG. 6C in accordance with an embodiment of the invention. As can be appreciated, the wiping blades 63 have generally upward directed grooves that can spread the feedstock generally upwards against gravity, such as at angles in the range of about 0 to about 90 degrees, about 5 to about 50 degrees, about 10 to about 45 degrees, or other positive angular orientations relative to a horizontal plane. It should be recognized that the implementations illustrated in FIG. 6C are provided by way of example, and a variety of other implementations are contemplated.

Referring back to FIG. 6A and FIG. 6B, a residence time and a reaction time of the feedstock in the jacketed vessel 65 can be controlled by a variety of factors, such as rotor speed, dosing rate of the feedstock, design of grooves, design of the blade assembly 62, and so forth. The flash guard 64 inhibits or prevents any solid residue formed during catalyst-assisted cracking, such as carbon particles formed on the internal surface of the jacketed vessel 65, from contaminating a resulting cracked vapor phase, which is conveyed into an annular region of the rotor. This vapor rises through a set of vapor outlets 61 and then through a nozzle 57. A solid or semi-solid residue formed during cracking falls to a bottom plate of the jacketed vessel 65, which has an inclination angle to allow the residue to flow to one end of the jacketed vessel 65. Once at that end, the residue is conveyed by a suitable mechanism, such as a screw conveyer, to remove the residue on a substantially continuous basis. As illustrated in FIG. 6A, the jacketed vessel 65 also includes a dish-shaped end at its bottom, which provides an annular region below the inclined bottom plate, and includes an additional heating medium to maintain the residue at a desired temperature for conveyance.

Turning back to FIG. 4, a set of catalysts is provided or made available to the cracking device 18 by substantially continuous dosing, such as via a pump. Dosing can be achieved in a controlled matter by a flow control device. There is also a provision for coating of inner surfaces of the cracking device 18 by a desired set of catalysts. For certain implementations, either, or both, of the heat transfer surface and the rotating device (or a spraying, falling film, rising film, roller, or any other mechanism used to create a thin film as well as convey uncracked residues towards the bottom) can be coated with a set of catalysts. In another aspect of the design of the cracking device 18, a set of catalysts can be made available throughout a transition from a liquid or liquid slurry to various cracked fractions of hydrocarbons, and a composition and relative proportions of the catalysts can vary at different locations within the cracking device 18, depending upon a composition of cracked hydrocarbons at a particular location, thereby achieving higher cracking yields. For example, a composition and relative proportions of the catalysts can vary from top to bottom, with a higher dosing or amounts of certain ones of the catalysts at the bottom relative to the top.

The cracking device 18 is maintained under a nitrogen (or any other inert gas) blanketing so as to substantially exclude oxygen and other atmospheric gases. The cracking device 18 is thus substantially purged of oxidizing gases and is pressure-controlled. To achieve thermo-catalytic cracking, the cracking device 18 is heated to a range of about 400° C. to about 420° C. by a molten salt heating medium, which can include an eutectic mixture of water soluble inorganic salts of potassium nitrate, potassium nitrite, and sodium nitrate. The heating medium is provided from a heater 40 and circulated by a pump 41 in a closed circuit. A primary heat source for the heater 40 are off gases stored in the vessel 29, which is illustrated in FIG. 5, optionally supplemented by fuel from another source. The off gases, along with any supplemented fuel, are fired into the heater 40 by a burner 31A. A dump tank 42 is included for storage of molten salt, and is heated with a heating coil using thermal oil from the thermal oil heater 38 at the time of initial start-up and at the time of shut-down. A pump 43 conveys the molten salt to the heater 40 at start-up.

Cracked hydrocarbons in a gaseous form are conveyed for molecular restructuring as further described below. Residues and contaminants, which are substantially continuously removed from the heat transfer surface of the cracking device 18, are recovered in the form of a semi-solid or slurry from the bottom of the cracking device 18. These residues are cooled in a heat exchanger 32, conveyed to a receiver 35, and then conveyed by a pump 36 to a container 37. Alternatively, or in conjunction, these residues are conveyed via a screw conveyor 33 to a receiver 34.

The catalysts used in the cracking device 18 typically assist in cracking of carbon chains longer than C25, and a resulting cracked material passes to a catalytic converter or reformer 19, which is maintained at a desired temperature by a temperature control valve and a controller. The catalytic converter 19 includes a set of catalysts to reform short carbon chains, such as those shorter than C6. By operating in conjunction, the cracking device 18 and the catalytic converter 19 can produce a fuel composition with a carbon chain spanning C8 to C25. A majority of resulting hydrocarbon molecules can include sixteen carbon atoms per molecule, and can satisfy the criteria of commercially acceptable fuel, such as commercially acceptable diesel fuel.

Referring next to FIG. 5, vapors exiting the catalytic converter 19 are conveyed to a fractionating column 20, where the following four streams of end products are separated: (1) Gaseous stream of non-reformed fractions or off gases, with carbon chain distribution in the range of C1 to C4 (hydrocarbons with carbon chain distribution in the range of C5 to C7 can be included in this stream, another stream described below, or as a separate stream); (2) Fuel with carbon chain distribution in the range of C8 to C13, conforming generally to gasoline (petrol) or kerosene; (3) Fuel with carbon chain distribution in the range of C14 to C20 and peaking at about C16, conforming generally to diesel; and (4) Heavy fuel with carbon chain distribution in the range of C20 to C25.

Off gases exiting a top of the fractionating column 20 are cooled by a heat exchanger 25, and are conveyed through a scrubber 26, where the gases are scrubbed with an alkaline solution or a caustic solution and circulated by a pump 27. The cooled and scrubbed gases are next conveyed by a pump 28 and stored in a reservoir 29. A pressure control valve PCV regulates a pressure of the reservoir 29, and excess gases are released to a flaring device 30. The reservoir 29 also serves as a fuel source for the burners 31A and 31B, which were previously described with reference to FIG. 4.

Referring to FIG. 5, the other fuel streams are condensed in respective condensers 21A, 21B, and 21C, and are then conveyed to respective reflux vessels 22A, 22B, and 22C. A portion of a condensate in each stream is refluxed back to the fractionating column 20, while remaining distillates (overhead products) are conveyed to storage tanks 24A, 24B, and 24C, assisted by pumps 23A, 23B, and 23C. Although the fractionating column 20 is illustrated as producing four streams or fractions, more or less streams can be collected and stored depending upon the particular application.

Laboratory analysis indicates that resulting fuels are consistent with the criteria for commercially acceptable fuel, such as in terms of carbon chain distribution with a peak occurrence of C16 molecules. A flash point of the fuels can be in the range of about 18° C. to about 60° C., and blends of the fuels can yield various industrial fuels with desirable flash points.

Figure 7:
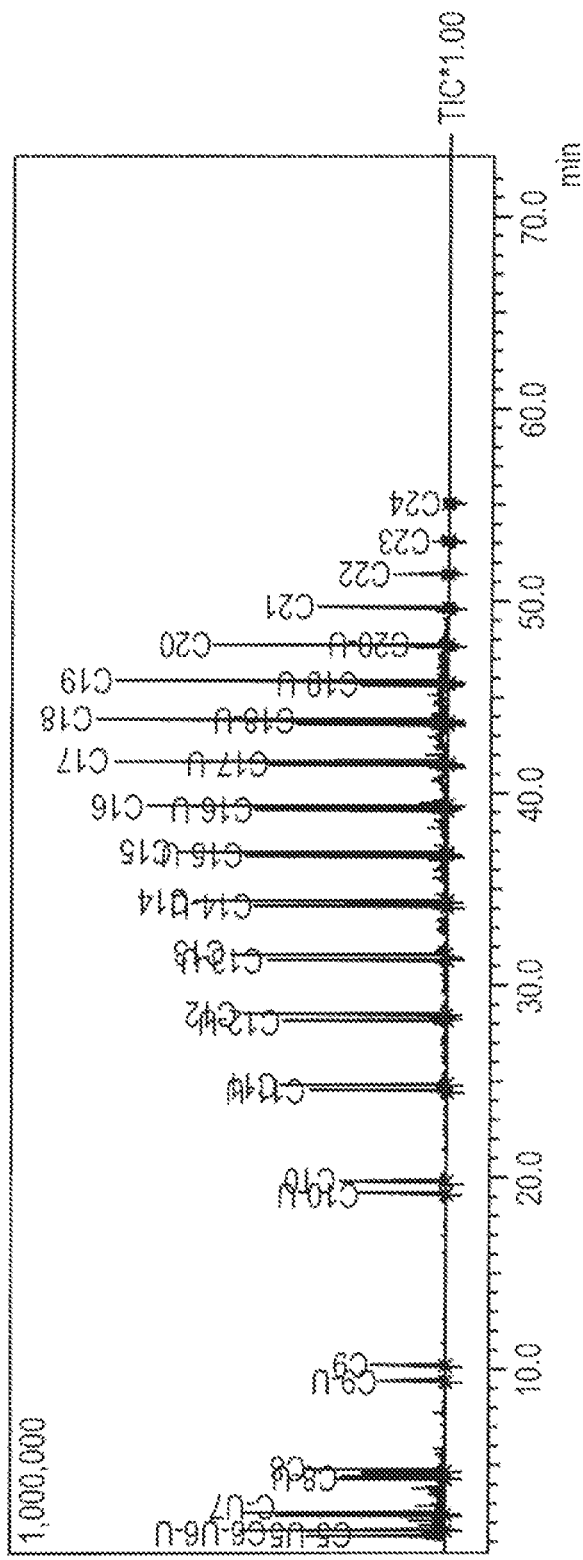
FIG. 7 illustrates a gas chromatogram indicating relative proportions of carbon chain lengths within a fuel produced in accordance with an embodiment of the invention.

In some instances, characteristics of resulting fuels can be dependent upon types of raw materials used, as the raw materials can vary in their molecular structures. In one instance, a mixture of 10% by weight of waste oil, 40% by weight of high density polyethylene (HDPE), and 40% by weight of low density polyethylene (LDPE) yielded a resulting product with the results of Table 1 that are expressed in % by weight (approximate). FIG. 7 illustrates a gas chromatogram of the resulting product.

TABLE 1

| | |
|---|---|
| Non-condensable gases | 5 |
| Fraction C8 to C13 | 5 |
| Diesel C14-C20 | 78 |
| Fraction C20-C25 | 7 |
| Residue | 5 |

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A cracking device for converting higher hydrocarbons into lower hydrocarbons, comprising:
   a jacketed vessel including a top, a bottom, and an internal surface;
   a blade assembly housed in the jacketed vessel and including wiping blades adjacent to the internal surface of the jacketed vessel;
   and a motor connected to the blade assembly and configured to rotate the blade assembly, wherein the jacketed vessel is configured to receive a feedstock adjacent to the top of the jacketed vessel, and, upon rotation of the blade assembly, the wiping blades are configured to spread the feedstock to create a film of the feedstock adjacent to the internal surface of the jacketed vessel;
   wherein the jacketed vessel further includes a coating adjacent to the internal surface of the jacketed vessel, and the coating includes a set of catalysts to promote cracking of the feedstock.

2. The cracking device of claim 1, wherein, upon rotation of the blade assembly, the wiping blades are configured to slide in a radial direction towards the internal surface of the jacketed vessel.

3. The cracking device of claim 1, wherein the jacketed vessel is configured such that cracked feedstock is removed adjacent to the top of the jacketed vessel, and uncracked residues are removed adjacent to the bottom of the jacketed vessel.

4. A cracking device for converting higher hydrocarbons into lower hydrocarbons, comprising:
  a jacketed vessel including a top, a bottom, and an internal surface;
  a blade assembly housed in the jacketed vessel and including wiping blades adjacent to the internal surface of the jacketed vessel;
  and a motor connected to the blade assembly and configured to rotate the blade assembly, wherein the jacketed vessel is configured to receive a feedstock adjacent to the top of the jacketed vessel, and, upon rotation of the blade assembly, the wiping blades are configured to spread the feedstock to create a film of the feedstock adjacent to the internal surface of the jacketed vessel;
  wherein, upon rotation of the blade assembly, the wiping blades are configured to spread the feedstock in a generally upward direction.

5. The cracking device of claim 4, wherein at least one of the wiping blades includes a groove having a positive angular orientation relative to a horizontal plane.

6. A cracking device, comprising:
  an interior chamber including a catalyst;
  an exterior jacket encompassing the interior chamber;
  a heat supply positioned between the exterior jacket and the interior chamber, the heat supply configured to heat a surface of the interior chamber;
  a blade assembly;
  an intake configured to receive a waste material in the form of a liquid or a liquid slurry, wherein the cracking device is configured to allow for a relative movement between the interior chamber and the blade assembly and thereby wipe the received waste material along a portion of the surface of the interior chamber; and
  a vapor outlet configured to convey gases out of the cracking device following a cracking of the received waste material through the wiping of the received waste material along the portion of the surface of the interior chamber in the presence of the catalyst;
  wherein the blade assembly is configured such that the relative movement between the interior chamber and the blade assembly moves the received waste material in a direction of at least partial opposition to gravity, thereby increasing a residence time of the wiped received waste material along the portion of the surface of the interior chamber.

7. The cracking device of claim 6, wherein the heat supply is a heating medium.

8. The cracking device of claim 6, wherein the heat supply is a heating source.

9. The cracking device of claim 6, wherein the heat supply heats the surface of the interior chamber such that the received waste material is heated to a temperature within the range of 325° C. to 425° C.

10. The cracking device of claim 6, the blade assembly comprising a plurality of blades, wherein at least one of the plurality of blades is configured to slide radially towards the surface of the interior chamber.

11. The cracking device of claim 6, wherein the interior chamber is pressure controlled.

12. The cracking device of claim 6, wherein the blade assembly is configured such that the relative movement between the interior chamber and the blade assembly conveys, aided by gravity, a cracking residue to a portion of the cracking device at a lower elevation than an elevation of the intake.

13. A cracking device, comprising:
  an interior chamber including a catalyst;
  an exterior jacket encompassing the interior chamber;
  a heat supply positioned between the exterior jacket and the interior chamber, the heat supply configured to heat a surface of the interior chamber;
  a blade assembly;
  an intake configured to receive a waste material in the form of a liquid or a liquid slurry, wherein the cracking device is configured to allow for a relative movement between the interior chamber and the blade assembly and thereby wipe the received waste material along a portion of the surface of the interior chamber; and
  a vapor outlet configured to convey gases out of the cracking device following a cracking of the received waste material through the wiping of the received waste material along the portion of the surface of the interior chamber in the presence of the catalyst;
  the blade assembly comprising at least one blade, wherein the catalyst is coated on at least one of the at least one blade and the portion of the surface of the interior chamber.

* * * * *